US008457448B2

(12) United States Patent
Shelton et al.

(10) Patent No.: US 8,457,448 B2
(45) Date of Patent: Jun. 4, 2013

(54) REMOVING INSERTED TEXT FROM AN IMAGE USING EXTRAPOLATION FOR REPLACEMENT PIXELS AFTER OPTICAL CHARACTER RECOGNITION

(75) Inventors: Gerold K. Shelton, Meridian, ID (US); Curtis Gold, Meridian, ID (US); Michael J. Shelton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1094 days.

(21) Appl. No.: 12/250,852

(22) Filed: Oct. 14, 2008

(65) Prior Publication Data

US 2009/0196512 A1 Aug. 6, 2009

Related U.S. Application Data

(60) Provisional application No. 61/026,025, filed on Feb. 4, 2008.

(51) Int. Cl.
*G06K 9/03* (2006.01)
*G06K 9/34* (2006.01)

(52) U.S. Cl.
USPC .......................................... 382/309; 382/176

(58) Field of Classification Search
USPC .......................................................... 382/309
See application file for complete search history.

(56) References Cited

U.S. PATENT DOCUMENTS

| | | | | | |
|---|---|---|---|---|---|
| 5,682,439 | A | * | 10/1997 | Beernink et al. | 382/187 |
| 5,933,543 | A | * | 8/1999 | Cok | 382/264 |
| 6,360,951 | B1 | * | 3/2002 | Swinehart | 235/472.01 |
| 6,396,951 | B1 | * | 5/2002 | Grefenstette | 382/187 |
| 6,735,347 | B1 | * | 5/2004 | Bates et al. | 382/282 |
| 6,766,069 | B1 | * | 7/2004 | Dance et al. | 382/309 |
| 6,940,617 | B2 | * | 9/2005 | Ma et al. | 358/1.15 |
| 6,985,673 | B2 | * | 1/2006 | Molldrem, Jr. | 396/2 |
| 7,069,240 | B2 | * | 6/2006 | Spero et al. | 705/30 |
| 2004/0034835 | A1 | * | 2/2004 | Kuruoglu et al. | 715/530 |
| 2004/0139384 | A1 | * | 7/2004 | Lin | 715/500 |
| 2004/0146199 | A1 | * | 7/2004 | Berkner et al. | 382/176 |
| 2006/0210198 | A1 | * | 9/2006 | Suenaga et al. | 382/321 |
| 2006/0215233 | A1 | * | 9/2006 | Hirai et al. | 358/448 |
| 2007/0203981 | A1 | * | 8/2007 | Takano et al. | 709/204 |
| 2008/0095442 | A1 | * | 4/2008 | Ekin et al. | 382/187 |
| 2008/0239365 | A1 | * | 10/2008 | Salgado et al. | 358/1.15 |

OTHER PUBLICATIONS

Business Wire; "NSi Announces the Introduction of Its EVOLUTION Kiosk"; press release; Apr. 17, 2007; http://www.businesswire.com/portal/site/google/index.jsp?ndmViewId=news_view&newsId=20070417005396&newsLang=en.

\* cited by examiner

*Primary Examiner* — David Zarka

(57) ABSTRACT

A method of removing inserted text from a digital image includes recognizing the inserted text in the digital image using optical character recognition; and replacing pixels of the digital image corresponding to the inserted text so as to remove the inserted text from the digital image. A computer program product for removing inserted text from a digital image includes an inserted text removal program stored on a computer-readable medium, the program including an optical character recognition module for recognizing inserted text in a digital image; and an extrapolation module for replacing pixels corresponding to the inserted text in the digital image with replacement image pixels so as to remove the inserted text from the digital image. A photo printing kiosk includes an interface for receiving a digital image; an optical character recognition module for recognizing inserted text in the digital image; and an extrapolation module for replacing pixels corresponding to the inserted text in the digital image with replacement image pixels so as to remove the inserted text from the digital image.

17 Claims, 3 Drawing Sheets

REMOVING INSERTED TEXT FROM AN IMAGE USING EXTRAPOLATION FOR REPLACEMENT PIXELS AFTER OPTICAL CHARACTER RECOGNITION

CROSS REFERENCE TO RELATED APPLICATIONS

This Application claims the benefit of provisional patent application Ser. No. 61/026,025, filed Feb. 4, 2008 titled "Method And System For Removing Inserted Text From An Image" which application is incorporated by reference herein as if reproduced in full below.

BACKGROUND

Many retail stores and other public locations have installed interactive kiosks that allow patrons easier access to quality photograph printing. A user may operate a digital camera to take digital photographs that are then stored electronically as digital image files on the camera or some other data storage device. The user then transfers the digital image files to the interactive kiosk. Once the data is transferred to the kiosk, the user may then edit and print the photographic images. Typically, such kiosks print pictures on photographic print media with a high image quality.

Many digital cameras allow for a digital date stamp to be placed on the image file identifying the date the photo was taken. Although this may be helpful for a user in identifying the date, origin and subject matter of the photograph, it may not be desirable for a date stamp to be present on a hardcopy of a photograph for several reasons. For example, when adding pictures to a photo album or scrap book project, it may be undesirable for the date stamp to be present because the date stamp may draw the audience's attention from the subject matter of the photograph and may reduce the overall aesthetic quality of the project.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
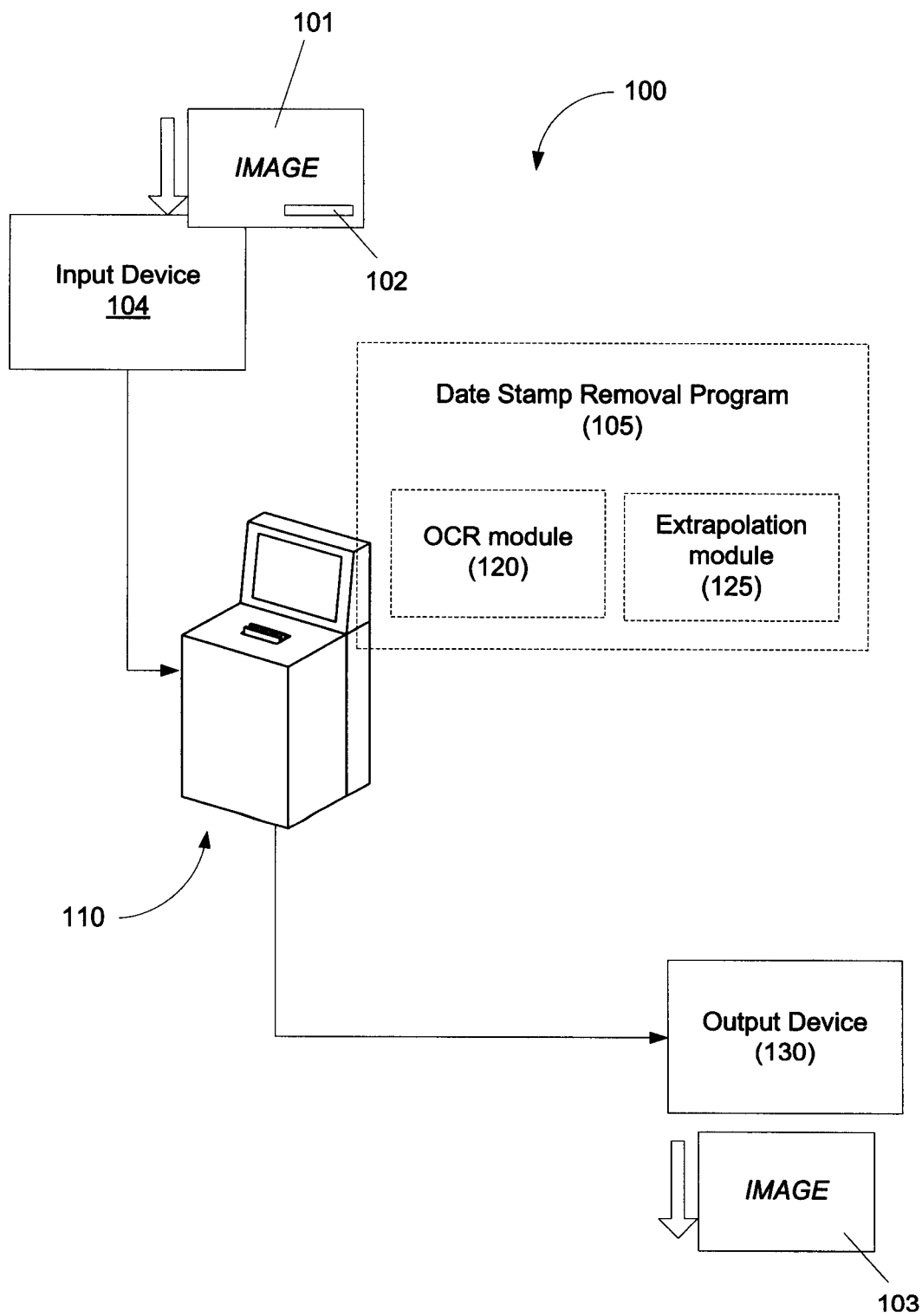
FIG. 1 is a block diagram of an illustrative embodiment of a system for removing inserted text from a digital image according to principles disclosed herein.

The present specification describes, among other things, a method of editing photographic images so as to identify and remove inserted text via optical character recognition (OCR) software and image extrapolation methods. The OCR software is provided so that the inserted text may be autonomously detected. Image extrapolation software may also be provided so that the inserted text may be removed from the digital image and replaced by extrapolated image pixels.

As outlined above, in recent years, many photo kiosks have been incorporated into retail stores and other locations to allow for the convenience of patrons. The kiosks allow for a patron to upload, edit and print their digital photos from portable electronic devices such as mobile phones, personal digital assistants (PDAs) and MP3 players which may incorporate a digital camera for taking digital pictures or may at least have the ability to receive, store and display digital image files.

Many electronic devices that incorporate a digital camera allow a user to add a date stamp to the digital image or may automatically insert a date stamp into each image taken. In either case, this date stamp is helpful in identifying the exact date the picture was taken, and can consequently be helpful in identifying the subject matter and origin of the picture. However, in many applications, the date stamp may become undesirable. This is true whether the date stamp appears automatically or the user has previously added a date stamp to a digital photograph and later wishes to remove the date stamp.

One prior solution to removing the date stamp was to provide for software designed to remove the date stamp. This software is often generally referred to as a rubber stamp tool and is included in specialized software packages. Although it is possible to remove a date stamp with a rubber stamp tool, this process requires time and assumes that the user has the requisite knowledge and artistic skill to properly edit the photograph. As a result, many users end up foregoing the date stamp editing process and the date stamp remains on the photograph even if unwanted by the user.

Another solution is to crop the photograph so that the date stamp is removed from the photograph. Although this solution is fairly user-friendly, a negative consequence is that this process also removes portions of the image that a user may otherwise wish to retain.

Yet another solution is to use other image software, for example, an editor plug-in or stand alone image editor. However, this solution again requires time and expertise on the part of the user. For example, the user accesses the image with the editor software and then manipulates the software to remove the date stamp. Again, this process may be too cumbersome for many users who will instead simply retain the date stamp even though they would prefer to remove it.

To address these issues, the present specification describes, among other things, a method and system for automatically removing a date stamp located on an image via optical character recognition and image extrapolation software.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As noted above, many electronic devices that incorporate a digital camera allow a user to add a date stamp to the digital image or may automatically insert a date stamp into each image taken. Additionally, the camera may add other text to the digital image as directed by the user. For example, the user may input a descriptive label of the event being photographed, such as "Birthday," "Anniversary" or "Vacation"

that the camera or other device might add to the digital image. Consequently, as used herein and in the appended claims, the term "date stamp" may be used to refer to any text that was not part of the scene depicted in a digital image, but that was added to the digital image by the camera taking the image or by a subsequent device editing the image. Under this definition, the term "inserted text" may include, but is not limited to, any time, date or other labeling inserted into a digital image including, for example, such labels as "Birthday," "Anniversary" or "Vacation." The term "inserted text" will similarly be defined as referring to any text that was not part of the scene depicted in a digital image, but that was added to the digital image by the camera taking the image or by a subsequent device editing the image.

The present specification provides for exemplary systems and methods of removing a date stamp or other inserted text from a photographic image in an automated, user-friendly manner. A user may be able to restore a photograph to a version that does not include any inserted text for use in various projects where the inserted text, e.g., a date stamp, would otherwise detract from the presentation of the photograph.

Turning now to the figures, and, specifically, FIG. 1, a system for removing a date stamp or other inserted text (100) according to one illustrative embodiment is depicted in block diagram format. As shown in FIG. 1, a user initially provides image data representing the image to be edited with an input device (104).

In various embodiments, the input device (104) may be any of a variety of devices. For example, the input device (104) may include an optical scanner with which the user scans a photograph (101) containing inserted text (102). In another example, the input device (104) may include a digital camera or a device, such as a mobile phone or PDA, that incorporates a digital camera, with which the photograph (101) is taken. In other examples, the input device (104) may be a data storage or memory device, such as a flash memory drive, a hard drive or other memory device capable of containing image data representing the date-stamped photograph (101).

Once the image data is available, the input device (104) is interfaced with an image data processing system (110), for example, a photo printing kiosk, as shown in FIG. 1. The input device (104) may be directly interfaced with the system (110) or interfaced with the system (110) through a network. The digital date-stamped image (101) may be created on one input device (104) and then transferred to another input device (104) that is or can be interfaced with the processing system (110).

The data processing system (110) includes an inserted text removal program (105). This program (105) may include an Optical Character Recognition (OCR) Module (120) that recognizes text, such as a date stamp or other inserted text (102), in the otherwise graphic image (101) provided by the input device (104). The inserted text removal program (105) may also include an extrapolation module (125). The extrapolation module (125) will use pixels of the image (101) surrounding the inserted text (102) to extrapolate pixel data to be added to the image (101) in place of the inserted text (102). The operation of the inserted text removal program (105), and its OCR and extrapolation modules (120, 125), will be described in more detail below.

Finally, the edited image data is sent to an output device (130). The output device may be a photograph printer communicatively connected to the kiosk (110). Additionally or alternatively, the output device (130) may be an electronic display for displaying the edited image (103) without the inserted text (102).

The output device (130) may also include a data storage device on which the edited image data (103) may be stored. For example, the output device (130) may, in some embodiments, be the same data storage or memory device used as the input device (104).

Figure 2:
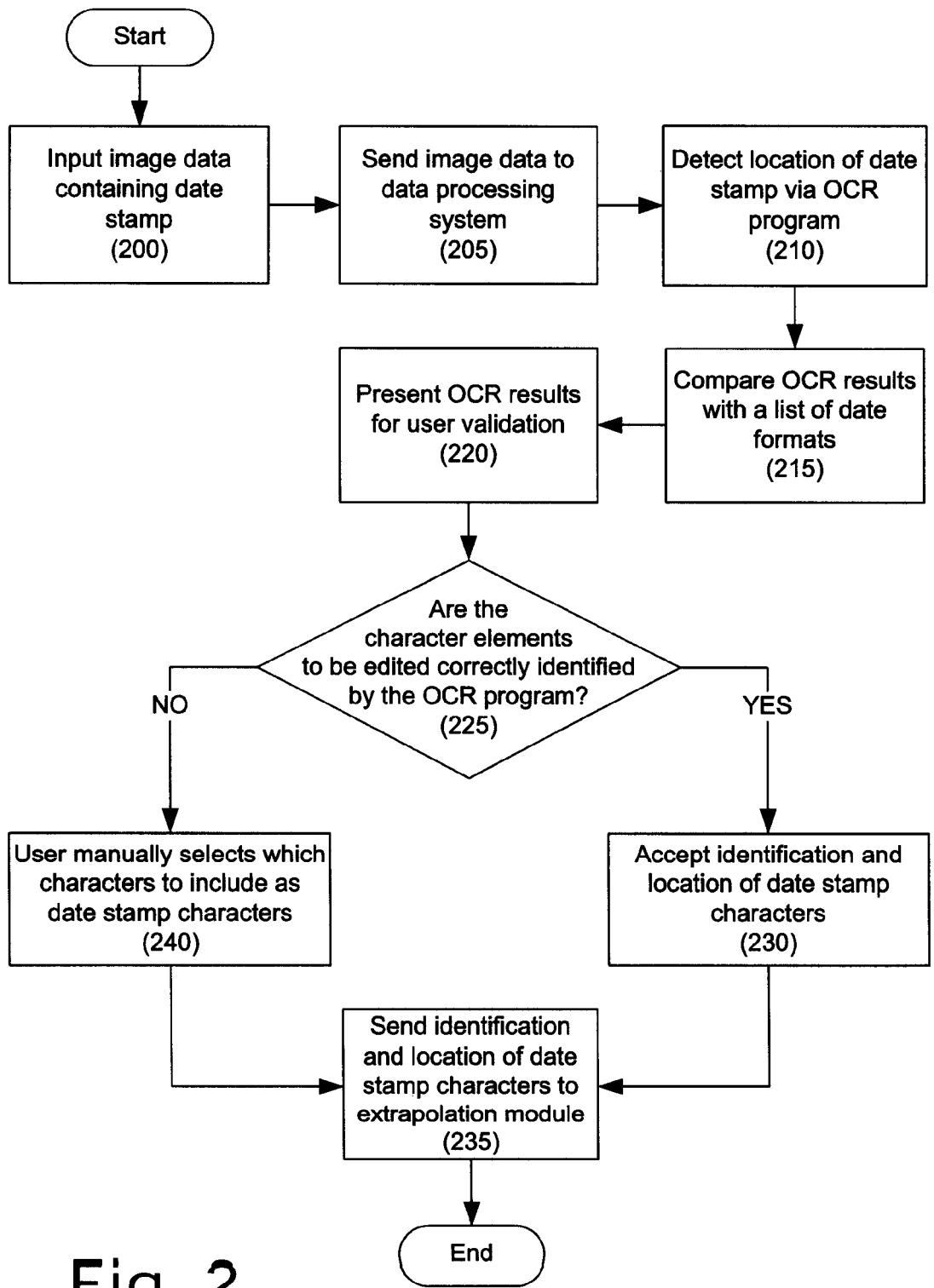
FIG. 2 is a flow chart depicting an illustrative embodiment of a method of locating and recognizing inserted text in a digital image according to principles disclosed herein.

Referring now to FIG. 2, a flow chart is provided depicting a method of locating and recognizing inserted text. Initially, the user may input the image data containing the inserted text (step 200). This may be done, for example, using an input device as explained above.

That image data is then accessed by the data processing system (110, FIG. 1) as described above. The image data is then processed by the data processing system (110, FIG. 1) using, for example, an inserted text removal program (105, FIG. 1) (step 205). As described above, the inserted text removal program (105, FIG. 1) may include an OCR module (120, FIG. 1) that automatically identifies and selects the exact pixels of the image that form the date stamp or other inserted text and that are to be removed from the image (step 210).

In some embodiments, the user may specifically identify in which portion of the image the inserted text to be removed is located. This may be, for example, by the user indicating a particular quadrant or fraction of an image in which the inserted text is located. This may be done with a user interface of a kiosk like that shown in FIG. 1. Alternatively, the user interface may allow the user to identify and select a specific area of the image where the inserted text is located. For example, using a mouse, track pad, track ball or touch-sensitive screen, the user may draw a box around the inserted text in the image. In any such case, the portion of the image indicated by the user is then specifically processed by the OCR module (120, FIG. 1) to identify the inserted text to be removed from the image.

In some examples, where the inserted text to be removed is or might include an actual date stamp, the OCR results are then compared to a list of known date formats (step 215). This allows the OCR module (120, FIG. 1) to distinguish a date stamp from other recognizable text that may be present in the image being processed. If the identified text matches any of the known date formats listed, the text may be assumed to be a date stamp. Similarly, the OCR results may be compared to other common phrases used as inserted text, for example, "Birthday," "Anniversary," "Vacation," the name of a holiday, etc. If the identified text matches any such phrases, the identified text is again assumed to be inserted text targeted for removal.

In some embodiments, the system may then proceed automatically to remove the identified date stamp or other inserted text from the image. In other embodiments, the system may present the presumed date stamp or inserted text to the user for validation that the text identified is, in fact, inserted text to be removed from the image (step 220). The user validation may occur via an interactive display with which the user determines what portions of the OCR results are the inserted text to be removed. Once the user then determines that the OCR results have correctly identified the inserted text to be removed (determination 225), the identification and location of the inserted text is accepted (step 230).

The identification and pixel location of the identified inserted text is then communicated to the extrapolation module (125, FIG. 1) (step 235). The extrapolation module (125, FIG. 1) then removes the pixels comprising the inserted text from the electronic image and replaces those pixels with data extrapolated from surrounding pixels so as to create a complete image (103) without the inserted text.

In various examples, the inserted text removal program (105, FIG. 1) may allow the user to cycle through each individual character, word or phrase that the OCR module (120, FIG. 1) has located and identified. This allows the user to selectively identify which text is to be removed from the image, whether or not that text is part of the inserted text. In some examples, the inserted text removal program (105, FIG. 1) will locate and identify only characters included in the inserted text and the user will simply accept the location and identification data supplied by the inserted text removal program (105, FIG. 1).

If, however, the user determines that the OCR results are not correct (determination 225), that the inserted text the user desired to remove has not been correctly identified, then the user may manually assist with the identification of the inserted text. For example, the OCR module (120, FIG. 1) may have identified the inserted text as text, but been unable to match the text to a known date format identifying the text as inserted text. In such a case, the user may manually indicate that the identified text is, in fact, the inserted text (step 240). In other examples, if the OCR module (120, FIG. 1) is entirely unable to identify any text in the image, the user may have to manually identify the location of the inserted text in the image. Finally, as indicated, above, when the inserted text characters have finally been identified and located, the information is communicated to the extrapolation module (125, FIG. 1) (step 235).

Figure 3:
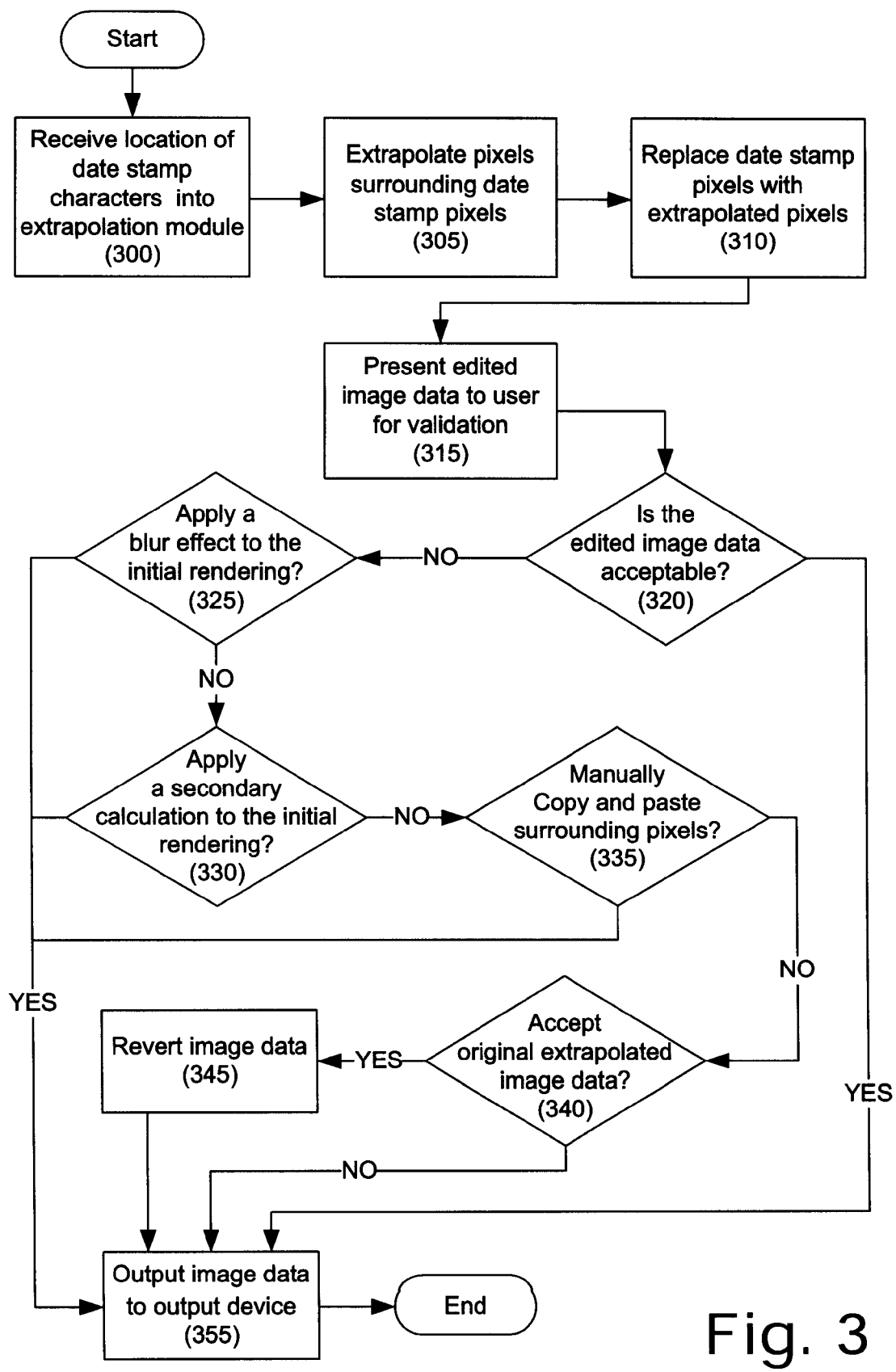
FIG. 3 is a flow chart depicting an illustrative embodiment of a method of removing inserted text from a digital image according to principles described herein.

Turning now to FIG. 3, a flow chart is provided depicting an illustrative method of removing inserted text from a digital image. To begin the process of removing the inserted text from the image, the location and identification data of inserted text characters is received from the OCR module (120, FIG. 1) as described above. This information defining the pixels of the inserted text characters to be removed is received by the extrapolation module (125, FIG. 1) (step 300).

As noted previously, the extrapolation process may occur by comparing the inserted text with pixels located in the area surrounding the inserted text. In one illustrative example, the pixels in the area surrounding the inserted text are marked as darker or lighter pixels. A blending effect is then applied by the extrapolation module (125, FIG. 1) such that a darker blend is applied to those pixels marked as lighter pixels, and a lighter blend is applied to those pixels marked as darker pixels. Ideally, the target opacity of the individual pixels is 50%, but any variance in opacity may be desirable in various applications.

In calculating the appropriate blend to apply to a given pixel, a three-by-three pixel square (three pixels tall and three pixels wide) is selected from the area surrounding the inserted text on one side of the character to be replaced as determined from the OCR module (120, FIG. 1) discussed above. An averaging algorithm then averages the lightness or darkness of the three pixels closest to the inserted text (the first layer) and compares them to the second and third layers of pixels. Once the lightness or darkness has been averaged, the averaged value of lightness or darkness is applied to the pixel being replaced.

The color of the pixels surrounding the inserted text is extrapolated from the same three-by-three pixel square. In some examples, the weight the first layer may have on the extrapolation of the color may be 50%. The weight the second and third layers have on the extrapolation of the color may be 30% and 20%, respectively. Again, as with the opacity may vary, so too may the weight an individual layer of pixels may have on the color extrapolation.

Further, differences between the first layer and the second and third layers may be noted to ensure that the color and contrast of one side of an inserted text character matches the other side of that same inserted text character. For example, if the left side of a given inserted text character is steadily becoming lighter, and the right side of the same character is steadily becoming darker, the average of the pixel color and contrast is calculated into the color and contrast values of the pixel being replaced.

The first layer of pixels surrounding the inserted text area is filled with the prevailing color sample from the three-by-three square. This prevailing color sample is often referred to as a "rubber stamp." If the color and contrast averaging of one side of a given character produce the same color and contrast results as those of the other side of that character, then the inserted text character between the two sides is filled in with those matching color and contrast values.

Finally, this process is repeated until an appropriate blend of color and matching contrast is applied to every pixel of the inserted text, moving inward from the outer edges of the inserted text and applying the method to the new, unaltered inner layer. Consequently, the date stamp pixels are replaced with extrapolated pixels (step 310).

In some examples, the user is then presented with the edited image data (step 315) for validation of the inserted text removal. The user validation may occur via an interactive display with which the user determines if the edited image data is acceptable (determination 320). If the user determines that the edited image data is acceptable (determination 320), then the edited image data is output using an appropriate output device as described above (step 355).

If, however, the user determines that the edited image data is not acceptable (determination 320), the user may be then presented with four additional options that will affect the edits already made to the image data (steps 325 through 340). The first of these options is to apply a blurring effect to the initial extrapolation and removal of the data stamp (determination 325). If selected by the user, this option allows the area of the image previously occupied by the data stamp to be blurred, thus further blending the image in the inserted text area. This may cause the inserted text area to better blend imperceptibly with the rest of the image.

If the user decides not the use the blurring effect (determination 325), then the user may decide to apply a second extrapolation calculation of the inserted text area using a five-by-five square rather than the three-by-three square discussed above (determination 330). This technique may allow for a better averaging of the inserted text area. This, in turn, would provide for better extrapolated color and contrast.

If the user decides not to apply a second extrapolation calculation (determination 330), then the user may manually change each pixel to the desired color and contrast. Though this makes the process of inserted text removal more time consuming, it would allow more adapted and skilled users to change the color and contrast to precisely the values desired. This too may result in a better, imperceptible removal of the inserted text.

Finally, if the user determines that an application of a blurring effect (determination 325), a secondary extrapolation calculation (determination 330) or manual editing of the image data (determination 335) is insufficient, the user may accept the original image data as first output by the extrapolation module (determination 340) (125, FIG. 1) as the data the user wishes to send to the output device (step 355). If the user chooses this option, the image is reverted to the form originally produced by the extrapolation module (step 345) (125, FIG. 1). The reverted image data may then be sent to the output device (step 355).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of removing inserted text from a digital image comprising, with a computer system:
   recognizing said inserted text in said digital image using optical character recognition;
   replacing pixels of said digital image corresponding to said inserted text so as to remove said inserted text from said digital image; and,
   after said replacing pixels corresponding to said inserted text, blending replacement pixels with adjacent pixels;
   wherein recognizing said inserted text further comprises presenting presumed inserted text to a user for validation, and
   in which replacing pixels of said digital image corresponding to said inserted text so as to remove said inserted text from said digital image comprises determining a brightness value for the replacement pixels by separately averaging brightness values of pixels in each layer of pixels of a pixel square, each layer of pixels in said pixel square being defined by distance from said replacement pixel.

2. A method of removing inserted text from a digital image comprising:
   with a data processing system having an interface for receiving said digital image from an input device, recognizing said inserted text in said digital image using optical character recognition; and
   with said data processing system, electronically replacing pixels of said digital image corresponding to said inserted text so as to remove said inserted text from said digital image;
   wherein replacing said pixels comprises extrapolating values for replacement pixels from surrounding pixels of said digital image;
   wherein said extrapolating comprises blending values from a pixel square, comprised of multiple pixels, located to one side of an inserted text character pixel being replaced to generate a value for a replacement pixel, and
   in which replacing said pixels comprises determining a brightness value for a replacement pixel by separately averaging brightness values of pixels in each layer of pixels of said pixel square, each layer of pixels in said pixel square being defined by distance from said replacement pixel.

3. The method of claim 2, further comprising determining a color for the replacement pixel using the same pixel square by blending color values for said pixels of said pixel square and weighting color values from different layers of pixels differently in the blend of color values.

4. The method of claim 2, further comprising repeating said extrapolating for each pixel to be replaced, starting with pixels at an outer edge of said inserted text and moving inward.

5. A method of removing inserted text from a digital image comprising:
   with a data processing system having an interface for receiving said digital image from an input device, recognizing said inserted text in said digital image using optical character recognition; and
   with said data processing system, electronically replacing pixels of said digital image corresponding to said inserted text so as to remove said inserted text from said digital image;
   wherein replacing said pixels comprises extrapolating values for replacement pixels from surrounding pixels of said digital image;
   wherein said extrapolating comprises blending values from a pixel square located entirely to one side of an inserted text character pixel being replaced to generate a value for a replacement pixel;
   wherein said blending comprises averaging values of pixels from said pixel square in different layers, layers being defined by distance within the pixel square from the inserted text character pixel being replaced.

6. The method of claim 5, wherein an average value from said different layers is assigned a different weight based on proximity of the corresponding layer to said inserted text character pixel being replaced.

7. A method of removing inserted text from a digital image comprising;
   with a data processing system having an interface for receiving said digital image from an input device, recognizing said inserted text in said digital image using optical character recognition; and
   with a data processing system, electronically replacing pixels of said digital image corresponding to said inserted text so as to remove said inserted text from said digital image;
   wherein replacing said pixels comprises extrapolating values for replacement pixels from surrounding pixels of said digital image;
   wherein said extrapolating comprises blending values from a pixel square located to one side of an inserted text character pixel being replaced to generate a value for a replacement pixel; and
   additionally averaging values of pixels from a larger square located to one side of said inserted text character pixel being replaced to generate a value for said replacement pixel.

8. A computer program product for removing inserted text from a digital image comprises an inserted text removal program stored on a non-transitory computer-readable medium, said program comprising:
   an optical character recognition module for recognizing an inserted text in a digital image; and
   an extrapolation module for replacing pixels corresponding to said inserted text in said digital image with replacement image pixels so as to remove said inserted text from said digital image;
   wherein said extrapolation module blends values from a pixel square, comprised of multiple pixels, located entirely to one side of an inserted text character pixel being replaced to generate a value for a replacement pixel, and
   in which said extrapolation module determines a brightness value for a replacement pixel by separately averaging brightness values of pixels in each layer of pixels of said pixel square, each layer of pixels in said pixel square being defined by distance from said replacement pixel.

9. The product of claim 8, wherein the extrapolation module, after said replacing pixels corresponding to said inserted text, blends replacement pixels with adjacent pixels.

10. The product of claim 8, wherein said optical character recognition module compares recognized characters with known date formats to identify a date stamp.

11. The product of claim 8, wherein said program further presents presumed inserted text to a user for validation.

12. A photo printing kiosk comprising a data processing system, said data processing system comprising:
- an electronic interface for receiving a digital image from an input device;
- an optical character recognition module for recognizing inserted text in said digital image; and
- an extrapolation module for replacing pixels corresponding to said inserted text in said digital image with replacement image pixels so as to remove said inserted text from said digital image;
- wherein said extrapolation module blends values from a pixel square located to one side of an inserted text character pixel being replaced to generate a value for a replacement pixel;
- wherein said blending comprises combining values of pixels from said square in different layers, layers being defined by distance within the square from the pixel being replaced.

13. The kiosk of claim 12, wherein said optical character recognition module compares recognized characters with known date formats or image labels to identify said inserted text.

14. The kiosk of claim 12, further comprising a user interface, wherein said optical character recognition module is configured to present presumed inserted text to a user for validation using said user interface.

15. The kiosk of claim 12, wherein said extrapolation module extrapolates values for said replacement image pixels from pixels surrounding said pixels corresponding to said inserted text.

16. The kiosk of claim 12, further comprising an electronic display for receiving said digital image with said inserted text removed.

17. The kiosk of claim 12, further comprising a printer for receiving said digital image with said inserted text removed.

* * * * *